3,488,404
Patented Jan. 6, 1970

3,488,404
DIEPOXY ALKANES AS EPOXY DILUENTS FOR POLYGLYCIDYL ETHERS OF POLYHYDRIC PHENOLS OR EPOXIDIZED NOVOLACS
Phillip H. Parker, Jr., San Rafael, Calif., assignor to Chevron Research Company, San Francisco, Calif., a corporation of Delaware
No Drawing. Filed Dec. 18, 1967, Ser. No. 691,216
Int. Cl. C08g 30/10, 30/02
U.S. Cl. 260—830                                     4 Claims

ABSTRACT OF THE DISCLOSURE

Epoxy resins are reduced in viscosity by the incorporation of an effective amount of $\alpha,\omega$-diepoxyalkane. The epoxy resins used include polyglycidyl ethers of polyhydric phenols and epoxidized novolacs. In an example 15 g. of 1,2:7,8 diepoxy octane were added to 100 g. of a bisphenol-epichlorohydrin epoxy resin and the mixture was cured with 15 g. of triethylene tetramine.

BACKGROUND OF THE INVENTION

Epoxy resins are used extensively in industry in protective coatings, adhesives, and structural plastics. In many of these applications low viscosity resins are essential. In other applications it is very desirable that the resins possess intermittent level viscosities. For example, in coating applications thin coatings may be obtained by low viscosity resins, but thicker coatings require resins of higher viscosity. Low viscosity resins are particularly important where spray coating is utilized, whereas when brushing or wet lay-up techniques are employed, higher viscosity resins are more useful.

In casting or molding applications, low viscosity resins are desirable where the molds are detailed and intricate, whereas higher viscosity resins may be economically employed for larger, less difficult to fill molds.

Another recent application in which low viscosity resins are employed is concerned with subterranean petroleum recovery. The epoxy resins are pumped down a well bore and subsequently cured to consolidate the subterranean formation and facilitate petroleum recovery. In order to economically pump the resins into the underground formation, they must be of low viscosity.

Field of the invention

The present invention is concerned with the field of synthetic resins and more particularly with low viscosity epoxy resins.

Prior art

One important method for reducing the viscosity of epoxy resins involves the addition of reactive diluents. Heretofore, attempts have been made to use a variety of compounds to reduce the viscosity of epoxy resins. In many instances, although the added compound may reduce the viscosity, it also has a serious effect on the other resin properties. For example, some reactive diluents cause uncontrolled exotherms or curing which may lead to thermal decomposition of some components and bubble formation or foaming.

Although various diepoxy compounds, such as the diglycidyl ethers, have been suggested or used as reactive diluents for epoxy resins, these compounds possess certain disadvantages. In particular, one of the most detrimental drawbacks is that relatively large amounts of these compounds are required in order to effectively reduce the viscosity.

Aside from the increased economical considerations incurred, the desired properties of the cured resin are seriously affected by the incorporation of additional quantities of diepoxy diluent. One drawback is that increased amounts of diluent alter the strength and hardness of the resin. In addition, the heat distortion temperature is lowered with increasing diluent concentration. In short, the larger the concentration of diluent, the greater the deviation from desirable properties of the original resin.

Another disadvantage of known diepoxy diluents is the adverse effect they produce on the water or chemical resistance of the cured system. A decrease in the water or chemical resistance limits the suitable applications for the resins.

In contrast, the present invention provides novel epoxy resins of controlled viscosity without adversely affecting the other important properties of the cured epoxy resins by the incorporation of relatively small amounts of novel reactive diluents.

SUMMARY OF THE INVENTION

Broadly stated, the present invention is concerned with the production of synthetic resins of controlled viscosity and more particularly with low viscosity epoxy resins. Specifically, the viscosity of epoxy resins is controlled by the incorporation of small but effective amounts of $\alpha,\omega$-diepoxyalkanes as reactive diluents.

In particular, we have now found that $\alpha,\omega$-diepoxyalkanes wherein the epoxy groups are separated by a straight chain alkyl group containing at least 4 carbon atoms possess unusually effective powers as reactive diluents for epoxy resins.

The epoxy resins suitable in the practice of the present invention are well known and are commercially available, a common class being the diglycidyl ethers of bisphenol A, obtained by reacting epichlorohydrin with bisphenol A in the presence of caustic such as sodium hydroxide or potassium hydroxide. In general, these materials may be represented by the formula:

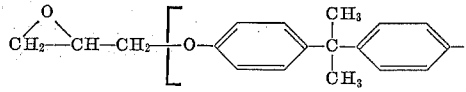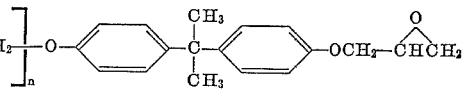

wherein $n$ is zero or an integer of 1 or higher number.

Generally, the epoxy resins are obtained as a mixture of monomeric diepoxides ($n=0$) and of polymeric diepoxides ($n \geq 1$). As is known in the art, by correlation of proportions of epichlorohydrin and bisphenol A, and caustic, the degree of polymerization can be controlled accordingly. Thus, increasing the epichlorohydrin to bisphenol A mol ratio, generally results in a mixture of diepoxide having a lower average molecular weight. On the other hand, increasing the mol ratio of sodium hydroxide to epichlorohydrin generally results in a mixture of higher average molecular weight.

Also, as is known in the art, other halohydrins than epichlorohydrin, such as 1,2-dichloro - 3 - hydroxypropane, and dichlorohydrin, can be used.

Similarly, in place of bisphenol A there can be used mononuclear di- and trihydroxy phenols, such as resorcinol, hydroquinone, pyrocatechol and phloroglucinol; polynuclear polyhydroxy phenols, such as 4,4'-dihydroxy diphenyl methane, trihydroxyl diphenyl dimethyl methane, and 4.4'-dihydroxy biphenyl.

Particularly useful hydroxyl intermediates in carrying out the present invention are the polynuclear polyhydroxy phenols also known as the novolac resins. Novolac resins containing 2 to 6, and as many as 12, phenolic hydroxyl groups per average molecule have been proposed in the preparation of the type of resin herein contemplated.

The novolac resins are well known substances, and many are available commercially. In general, these resins are prepared by condensing phenol with an aldehyde in the presence of an acid catalyst. Proportions of phenol and aldehyde in mol ratios of phenol to aldehyde greater than 1.1 and up to 2.5 are taught. As the aldehyde, formaldehyde is preferred, although the use of other aldehydes, such as acetaldehyde, chloral, butyraldehyde and furfural is permissible.

Similarly known is the condensation reaction of the epichlorohydrin with the novolac resin. The reaction is effected at a temperature in the range 140° F. to 300° F. between the novolac resin and at least about 3 mols of epichlorohydrin for each phenolic hydroxyl equivalent of the novolac resin in the presence of about 1 mol of alkali metal hydroxide per phenolic hydroxyl equivalent of novolac resin. When the reaction is complete, the epoxy resin is isolated from the reaction mixture by removal of alkali metal salt, of unreacted alkali, epichlorohydrin and water, and purified.

The α,ω-diepoxyalkane reactive diluents of the present invention may be represented by the structural formula

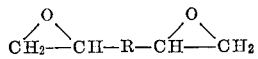

where R represents a saturated straight-chain alkyl group containing at least 4 carbon atoms and preferably 4 to 6 carbon atoms. Accordingly, the diepoxyalkanes must contain a total of at least 8 carbon atoms. The α,ω- prefix indicates that the epoxy groups are located at the terminal positions on the alkane molecule. Suitable compounds of the above class would include: 1,2:7,8 diepoxyoctane; 1,2:8,9 diepoxynonane, and 1,2:9,10 diepoxydecane. The preferred reactive diluent is 1,2:7,8 diepoxyoctane.

The reactive diluent of the present invention may be employed in conjunction with any of the known epoxy resin curing agents which include amines, dibasic acids, and acid anhydrides. The preferred class of curing agents is the acid anhydrides and in particular nadic methyl anhydride.

Other suitable acid anhydrides may include methyl succinic anhydride, dodecenylsuccinic anhydride, tricarballylic anhydride, alkenylanhydrides, itaconic anhydride, and others.

In the curing of epoxy resins with acid anhydrides, it is usually preferred to employ a catalyst although it is not absolutely necessary. Appropriate catalysts and proper concentrations are known in the art though a tertiary amine in an amount of from about 0.1% to 1% by weight of the epoxy resin-acid anhydride mixture is preferred.

Amines which are suitable for curing epoxy resins are known in the art. For example, those amines which may be used include: triethylamine, ethylene diamine, diethyl amine, diethylene triamine, triethylene tetramine, dicyandiamide, melamine and the like.

The curing agent is added and mixed in with the epoxy resin-diluent mixture to effect curing. The concentration employed will vary depending on the curing agent, resin, curing time, application etc., as delineated in the art.

The concentrations of diepoxyalkanes employed will usually range from about 3 to 100 parts per hundred parts of resin. Preferably, the concentration will range from 5 to 50 parts per hundred parts of resin. The wide variety of suitable resins and curing agents will necessarily result in a great latitude in permissible concentrations of diepoxyalkanes. Significantly, the initial viscosity of the resin and the desired level of viscosity for a particular application will determine the concentration level.

The α,ω-diepoxyalkanes may be incorporated with the epoxy resin by the simple mixing of the ingredients usually at room temperatures. Where the epoxy resin is particularly viscous, the resin may be heated and the reactive diluent added with mixing. In some cases the resin may be dissolved in a volatile solvent to allow mixing with the reactive diluent and subsequently the volatile solvent driven off.

The curing agents may be added to the epoxy resin-diluent mixture in the usual manner and at the usual times in relation to the particular application of the resins.

Example 1.—Preparation of 1,2:7,8 diepoxyoctane (a) A methylene chloride solution of peroxytrifluoroacetic acid was prepared by charging 300 ml. of methylene chloride and 302 g. (1.44 moles) of trifluoroacetic anhydride to a flask. Then, while maintaining the temperature of the stirred reaction mixture below 25° C., 56 g. (1.48 moles) of 90% hydrogen peroxide was added slowly. The resulting solution was used without further workup.

(b) A 5-liter, 4-necked flask, equipped with a stirrer, a reflux condenser, a thermometer and an addition funnel was charged with 1230 ml. of methylene chloride. 424 g. (4.0 moles) of anhydrous sodium carbonate, and 58.5 g. (0.53 mole) of 1,7-octadiene. The product of Example 1a was added dropwise to this mixture over a period of 4 hours. The rate of addition was such as to provide a gentle reflux. When all of the solution had been added, the product was stirred for an additional ½ hour at temperatures below 36° C. and then refluxed for ½ hour. At the end of this time, the material was filtered into a distillation flask and distilled through a Vigreaux column. The following cuts were obtained:

| Cut No.: | Boiling Point, ° C./12 mm. | Weight, g. |
|---|---|---|
| 1 | 70–101 | 3.15 |
| 2 | 101–102.5 | 10.43 |
| 3 | 102.5 | 29.81 |
| 4 | 102.5–104 | 10.50 |
| Bottoms | | 3.27 |

Cuts No. 2, 3, and 4 were combined to give a 67.5% yield of the desired diepoxy compound.

The properties of 1,2:7,8 diepoxyoctane as a reactive diluent were compared to those of two commercially available diepoxy diluents. The diluents were butanediol diglycidyl ether and poly 1,2 glycol diglycidyl ether. Table I illustrates the viscosity and epoxide equivalents of each compound.

TABLE I.—PROPERTIES OF DIEPOXIDES FOR EPOXY DILUENT

| Example | Diluent | Epoxide equivalent weight [1] | Viscosity at 25° C., cps. |
|---|---|---|---|
| 2 | 1,2:7,8 diepoxyoctane | 80 | 3 |
| 3 | Butanediol diglycidyl ether | 133 | 18 |
| 4 | Poly 1,2 glycol diglycidyl ether | 190 | 27 |

[1] Grams of material per epoxide group.

The viscosity of a bisphenol-epichlorohydrin epoxy resin diluted with the various compounds is shown in Table II. The epoxy resin had an initial viscosity of 12,200 centipoises.

TABLE II.—VISCOSITY OF BISPHENOL-EPICHLOROHYDRIN EPOXY RESIN DILUTED WITH DIEPOXIDES

| Example: | Diluent | Diluent concentration, phr. | Viscosity at 25° C., cps. |
|---|---|---|---|
| 5 | 1,2:7,8 diepoxyoctane | 15 | 820 |
| 6 | Butanediol diglycidyl ether | 15 | 1,700 |
| 7 | Poly, 1,2 glycol diglycidyl ether | 15 | 3,150 |
| 8 | 1,2:7,8 diepoxyoctane | 25 | 290 |
| 9 | Butanediol diglycidyl ether | 25 | 750 |
| 10 | Poly 1,2 glycol diglycidyl ether | 25 | 1,700 |

Example 11.—Room temperature cured resin diluted with 1,2:7,8 diepoxyoctane

To 100 g. of a bisphenol A based epoxide was added 25 g. of 1,2:7,8 diepoxyoctane. To 100 g. of this mixture was added 15 g. of triethylene tetramine. The mixture solidified in five hours and was hard in 24 hours. The product was clear and bubble free and had satisfactory hardness for surface coating and adhesive uses.

Example 12.—High temperature cured resin diluted with 1,2:7,8 diepoxyoctane

To 100 g. of a bisphenol A based epoxy resin was added 25 g. of 1,2:7,8 diepoxyoctane. To 100 g. of the above mixture was added 100 g. of nadic methyl anhydride and 2 g. of benzyl dimethylamine. The sample was heated at 94° C. and solidified in 5 minutes and was essentially completely polymerized in 30 minutes. The sample had excellent physical properties suitable for casting, laminating and adhesive applications. Substantially the same results were obtained when a novolac type epoxy resin was substituted for the bisphenol A based epoxy resin.

The water resistance of bisphenol-A-epichlorohydrin epoxy resin cured with nadic methyl anhydride (a Diels-Alder adduct of maleic anhydride and methylcyclopentadiene) was evaluated for three reactive diluents by measuring the amount of water absorption. The data in Table IV shows that the diepoxyalkane diluted resin was found superior in water resistance as compared to the other diluted resins. In fact, the diepoxyalkane diluted resin showed no increase in water absorption over the undiluted resin.

TABLE IV.—WATER ABSORPTION OF CURED EPOXY RESIN [1]

| Diluent, 25 phr. | Water absorption, percent |
|---|---|
| Example: | |
| 13 ............... None ........................... | .889 |
| 14 ............... 1,2:7,8 diepoxyoctane ............ | .886 |
| 15 ............... Butanediol diglycidyl ether ...... | .958 |
| 16 ............... Poly 1,2 glycol diglycidyl ether . | .972 |

[1] ASTM D570-63.

As will be evident to those skilled in the art, various modifications on the present invention can be made or followed in the light of the foregoing disclosure and discussion without department from the spirit or scope of the disclosure or from the scope of the following claims.

What is claimed is:

1. A synthetic resin composition comprising a mixture of an epoxy resin selected from the group consisting of (1) a polyglycidyl ether of a polyhydric phenol and (2) an epoxidized novolac and and α,ω-diepoxyalkane of the formula

where R represents a saturated straight-chain alkyl group containing from 4 to 6 carbon atoms said diepoxyalkane being employed in a range of from about 3 to 100 parts by weight per 100 parts by weight of said epoxy resins.

2. A resin as in claim 1 wherein the epoxy resin is prepared from a bisphenol and epichlorohydrin.

3. A resin as in claim 2 wherein the α,ω-diepoxyalkane is selected from the group consisting of 1,2:7,8 diepoxyoctane, 1,2:8,9 diepoxynonane and 1,2:9,10 diepoxydecane.

4. A resin as in claim 1 wherein the epoxy resin is a novolac resin.

References Cited

UNITED STATES PATENTS 3,293,071    12/1966    Peloquin _____ 117—104

FOREIGN PATENTS 966,917    8/1964    Great Britain.

MURRAY TILLMAN, Primary Examiner

PAUL LEBENMAN, Assistant Examiner

U.C. Cl. X.R.

260—2, 47, 348.5